(12) United States Patent
Breuer et al.

(10) Patent No.: US 10,448,316 B2
(45) Date of Patent: Oct. 15, 2019

(54) METHOD FOR TRANSMITTING SYSTEM INFORMATION BY A BASE NODE

(71) Applicant: Gemalto M2M GmbH, Munich (DE)

(72) Inventors: Volker Breuer, Boetzow (DE); Lars Wehmeier, Falkensee (DE)

(73) Assignee: GEMALTO M2M GMBH, Munich (DE)

(*) Notice: Subject to any disclaimer, the term of this patent is extended or adjusted under 35 U.S.C. 154(b) by 0 days.

(21) Appl. No.: 16/092,861

(22) PCT Filed: Apr. 18, 2017

(86) PCT No.: PCT/EP2017/059094
§ 371 (c)(1),
(2) Date: Oct. 11, 2018

(87) PCT Pub. No.: WO2017/186525
PCT Pub. Date: Nov. 2, 2017

(65) Prior Publication Data
US 2019/0141615 A1    May 9, 2019

(30) Foreign Application Priority Data
Apr. 29, 2016  (EP) .................................. 16167799

(51) Int. Cl.
*H04W 4/00*      (2018.01)
*H04W 48/12*     (2009.01)
(Continued)

(52) U.S. Cl.
CPC .......... *H04W 48/12* (2013.01); *H04W 84/042* (2013.01); *H04W 88/08* (2013.01)

(58) Field of Classification Search
None
See application file for complete search history.

(56) References Cited

U.S. PATENT DOCUMENTS 8,724,563 B2 * 5/2014 Yoo .................... H04L 1/0038
                                                    370/329
2017/0367003 A1 * 12/2017 Zhang .................. H04W 8/08

FOREIGN PATENT DOCUMENTS

WO    2016048045 A1    3/2016

OTHER PUBLICATIONS

Gemalto N.V.: "Applicability of Downlink Sub frames for Transmission", 3GPP Draft, R2-163370, 3rd Generation Partnership Project (3GPP), May 2016, 2 pages.
(Continued)

*Primary Examiner* — Erika A Washington
(74) *Attorney, Agent, or Firm* — Buchanan Ingersoll & Rooney PC

(57) ABSTRACT

A method for transmitting system information by a base node to at least one wireless communication device camping on the base node, the base node supporting a dedicated resource region for communication devices, which is capable of being deployed at least in-band and out-of-band relative to a common frequency band. The method includes collecting a configuration parameter for said dedicated resource region according to a predetermined time period and to arrange said configuration parameter in system information blocks. If the dedicated resource region is deployed in-band and a wideband transmission session is active, adding to at least one of the system information blocks a valid subframe indication for submitting system information blocks instead of wideband transmission blocks, and transmitting said system information blocks according to said valid subframe indication. In case it is not deployed in-band, transmitting the system information blocks unchanged in a carrier frequency outside of the common frequency band.

14 Claims, 3 Drawing Sheets

(51) Int. Cl.
  *H04W 84/04* (2009.01)
  *H04W 88/08* (2009.01)

(56) References Cited

OTHER PUBLICATIONS

Intel Corporation: "Email discussion report on [NBAH#05] [NBIOT/SI] System Information", 3GPP Draft, R2-161254 NB-IOT_SI_EMAIL-Discussion-5, 3rd Generation Partnership Project (3GPP), Feb. 2016, XP051065995, 30 pages.
International Search Report (PCT/ISA/210) dated Jun. 30, 2017, by the European Patent Office as the International Searching Authority for International Application No. PCT/EP2017/059094.
RAN WGI: "Status Report to TSG 1 Work plan related evaluation", 3GPP Draft, RP-160183, 3rd Generation Partnership Project (3GPP), Mar. 2016, XP051076140, 49 pages.
Samsung: "Impact on System Information for In-band Operations of NB-IoT", 3GPP Draft, R2-160516 Impact on System Information for In-Band Operations of NB-IOT, 3rd Generation Partnership Project (3GPP), Jan. 2016, XP051054802, 2 pages.
Written Opinion (PCT/ISA/237) dated Jun. 30, 2017, by the European Patent Office as the International Searching Authority for International Application No. PCT/EP2017/059094.

\* cited by examiner

METHOD FOR TRANSMITTING SYSTEM INFORMATION BY A BASE NODE

FIELD OF THE INVENTION

The present invention relates to a method for transmitting system information by a base node.

The invention also pertains to a base node using said method.

BACKGROUND OF THE INVENTION

The current evolution of third generation long term evolution (3GPP LTE) takes into account the increase of different types of wireless communication devices. In particular besides cell phones machine type communication (MTC) devices are getting more and more widespread. Further such evolvements have to consider that many MTC-devices have less computational power, which could even prevent them to operate in the LTE networks over the complete addressed bands.

For handling such low-cost devices it is therefore envisaged that other resource region are embedded in the normal LTE resource blocks, in particular supporting other modulation schemes. Known is in particular the narrowband-IoT (NB-IoT) modulation, which is dedicated for low-cost and low-bandwidth devices particularly used for Internet of Things (IoT) applications, as well as LTE-category 0 or 1.

Further some of the MTC devices are operating in areas with bad coverage, which cannot be fully mitigated by an increased transmission power. This in particular affects metering devices or vending machines. For solving this issue the concept of coverage enhancement resp. enhanced coverage (EC) was developed. This concept includes that by repeatedly transmission of signals an accumulation of energy at the receiving device is carried out which shall result in an increased link budget by e.g. up to 10 dB.

As part of the NB-IoT concept it is foreseen for such wireless communication devices a special set of system information. This special set is submitted in special system information blocks (SIBs), dedicated for narrowband-IoT supporting devices, both in normal and in enhanced coverage. Typically such SIBs are called SIBx-NB, for distinguishing from common SIBs for common devices. For simplicity reasons in the following these SIB for special wireless communication device deployment especially intended for NB-IoT are just called SIBs.

For accessing these SIBs in enhanced coverage they need to be transmitted and correspondingly received in a repeated manner leading to the coverage enhancement gain by combining each repetition.

An issue occurs however when in the periodicity of the SIB transmission the used resource is needed for other purposes. This would harm the SIB transmission as a wrong transport block in the averaging/accumulation process would ruin the whole acquisition/decoding attempt.

This appears in particular, when in parallel in the used frequency band a wideband communication session in the downlink, like multimedia broadcasting to a common mobile handset, is carried out. To acquire the system information all corresponding system information blocks need to be received and combined repeated times depending on their size and the coverage enhancement level needed. It is possible to schedule one or even more than one SIB around those subframes used for other purposes but not all of them without having severe constraints in scheduling. In this case system information blocks are not submitted in each subframe respectively in each subframe intended according to their individual repetition, but only in those where no multimedia broadcasting is scheduled.

The receiving wireless communication devices are put in the position to successfully include into the combining the relevant subframes by additional datafields submitted in one of the system information blocks. These additional datafields, the so-called valid subframe indications, are supposed to indicate in which subframe further SIBs can be expected and which subframes are not to be considered for the accumulation for any of the SIBs because of a wideband communication session, like MBMS or different content.

This situation in particular affects NB-IoT SIBs, all the more when transmitting in enhanced coverage. It is not only disadvantageous as it takes longer and is more power consuming through the subframes with no SIBs. Moreover the SIB1 carrying the valid subframe indications is increased in size through such additional datafields.

It is therefore the goal of present invention to overcome the mentioned disadvantages and to propose a solution for an improved system information block transmission for the dedicated resource region.

Further alternative and advantageous solutions would, accordingly, be desirable in the art.

SUMMARY OF THE INVENTION

For this it is according to a first aspect of the invention suggested a method for transmitting system information by a base node according to claim 1. It is further suggested according to a second aspect of the invention a base node according to claim 8.

According to the first aspect of the invention it is proposed a method for transmitting system information by a base node being part of a cellular wireless network for long term evolution, to at least one wireless communication device camping on the base node, the base node being configured to support a dedicated resource region for a subset of camping wireless communication devices, which is capable of being deployed at least in-band and out-of-band in relation to a common frequency band, the method comprising the steps of:

collecting configuration parameter for said dedicated resource region according to a predetermined time period and to arrange said configuration parameter in system information blocks, identifying if the dedicated resource region is deployed in-band, in case it is deployed in-band and a wideband transmission session is active, adding to at least one of the system information blocks an valid subframe indication for submitting system information blocks instead of wideband transmission blocks, and transmitting said system information blocks according to said valid subframe indication, in case it is not deployed in-band transmitting the system information blocks unchanged in a carrier frequency outside of the common frequency band The proposed method relates to base nodes of cellular wireless networks supporting the technology standard of long term evolution (LTE) networks, and further evolutions like LTE-M, LTE-Advanced etc. Such base nodes are typically known as eNodeBs. Such cellular wireless networks are preferably run by an operator in conjunction with additional radio access networks (RAN), e.g. 2G, 3G, or beyond 4G. If the general architecture of the base node is maintained for future generations, the inventive method is also applicable to such technology standards.

As part of the evolvement of the LTE standard, eNodeBs are further supposed to support dedicated resource regions. Such dedicated resource regions are embedded in the LTE frame structure. Such dedicated resource regions provide network resources for a special type of wireless communication devices, in particular low-cost resp. low-bandwidth devices, typically named as machine-type communication devices (MTC). In these embedded resources even different modulation schemes are possible, like narrowband-IoT, LTE-CAT-M, even a GSM type of modulation.

The low-bandwidth devices do not have to have the capability to process the whole range of 200 MHz in 1 ms, for operating in the cellular wireless network, it is sufficient to only handle the dedicated resource regions.

For such dedicated MTC devices also a special set of system information block (SIB) is foreseen. SIBs are a collection of relevant configuration parameter of the cellular wireless network regularly and repeatedly broadcasted to the wireless communication devices.

These SIBs are broadcasted within the dedicates resource region, in particular a special channel, like PDCH.

There are different approaches to deploy the dedicated resource region within the LTE band. As the LTE band is only occupied to 90% with 15 kHz spaced subcarriers, there is at the borders remaining an area called guardband, which can be used for dedicated resource region.

For deployment of the dedicated resource region it is consequently possible in-band deployment, that means amidst the LTE band frame structure, with potentially colliding resource requirements. Further out-of-band deployment is possible, which means the dedicated resource region or parts/channels of it is positioned in the guardband. Finally also standalone deployment, so unrelated to a common LTE band, is possible. The deployment can affect the whole dedicated region or only parts thereof, e.g. the SIBs, or only parts of the SIBs. That is effectively a mixed deployment.

One of the potential resource collisions in the LTE band appears when a wideband transmission session is active. This is in particular the case for high-volume transmissions, like multimedia broadcast multicast service (MBMS), or a sidelink operation for device-2-device communication to a relay device connected to further devices.

During wideband transmission sessions the whole allocatable band of a subframe is completely allocated to the wideband transmission. In that case no SIBs for the dedicated resources are scheduled.

In that case, the receiving wireless communication devices need to be informed about the scheduling, in particular when SIBs can be expected, and when this will not be the case. For that the first system information block SIB1 has an additional data-field, which is hereinafter called the valid subframe indication. With this data-field the wireless communication device can figure out in which subframes it can decode the various SIBs, and when this is not the case.

Typically such valid subframe indication is implemented as a bitfield resp. bit string where each bit indicates for which subframes the SIBs are allowed resp. not allowed to be read. It is expected that the size of the valid subframe indication might be comparably large in the area of >1000 bits.

Consequently a problem appears with the size of the SIB1, and the duration until all the SIBs, from SIB1 to SIB14 are successfully decoded. During a wideband transmission session a wireless communication device might need a remarkable amount of time until the whole set of SIBs is decoded. This is disadvantageous as it requires power, in particular for those wireless communication devices running on battery.

Hence it is advantageous when the SIBs are deployed out-of-band or stand-alone. Additionally the SIB1 is supposed to be kept as small as possible, in particular the valid subframe indication is here in the focus. Such indication would render no advantages, as in out-of-band deployment no collisions with subframes used for wideband transmission are available.

It is therefore suggested that before transmitting SIBs it is first checked if the SIBs are deployed in-band or not. Only if the SIBs are deployed in-band AND when a wideband transmission session is active, then the SIB1 is enhanced with the valid subframe indication and the SIBs are transmitted following the valid subframe indication.

Should the deployment not be in-band, then the last step can be omitted and the SIBs are continuously broadcasted—preferably in the guardband—without the valid subframe indication.

In effect it is suggested that the valid subframe indication is an optional field in SIB1, and only then used and populated when a collision between SIB-NBs and/or wideband transmission subframe is possible. In all other situation the SIB1 is shortened accordingly and the wireless communication devices receiving the SIB1 only have to decode the shorter SIB1 than when deployed in-band with colliding wideband transmissions.

The advantage of the inventive method is a double effect: The deployment in the guardband leads to faster transmission of the SIBs and the SIB1 is diminished compared to an in-band-SIB1 with full valid subframe indication. As the SIB1 is decoded most often from all SIBs, this solution renders remarkable advantages for wireless communication devices with limited battery resources.

Moreover the effect is tremendously increased when the base node is operating with at least one camping wireless communication device in enhanced coverage.

It is according to another preferred embodiment proposed a method wherein the system information blocks are transmitted according to a coverage enhancement scheme comprising a plurality of repetitions, whereby the repetitions are transmitted in the dedicated resource region in case of in-band deployment interrupted through at least one of the wideband transmission blocks and continuously otherwise.

According to this embodiment the repetitions of the SIBs until they are sufficiently decoded by the receiving wireless communication device needs to be coped with. It is therefore suggested that in case of out-of-band deployment the SIBs are repeated without interruption.

It is further suggested according to another preferred embodiment a method further comprising the step of evaluating if the wideband transmission session is active and if the system information blocks are supposed to be transmitted according to an coverage enhancement scheme, and deploying at least one system information block out-of-band in case of the active wideband transmission session.

With that embodiment the base node gets aware of the situation that wireless communication devices operating in enhanced coverage are currently camping on the base node. Should then a wideband transmission session become active, then the base node takes measures to safely supply the low-bandwidth wireless communication devices operating with the dedicated resource region at least with the system information.

Hence it takes the decision that at least parts of the system information blocks are shifted to out-of-band deployment, if available. This might not affect all SIBs, but nonetheless the time until all SIBs are decoded, in particular having in mind the repetitions for enhanced coverage, is immensely reduced.

This is in particular advantageous as it minimized the risk that a wireless communication device operating in enhanced coverage might not manage to read the whole set of SIBs during one BCCH modification period. Should this not be manageable, the reading would start again and much more power is drained.

It is further suggested for such a situation another embodiment comprising the step of transmitting at least one system information block repeatedly according to a frequency hopping sequence by aligning the frequency hopping sequence with the wideband transmission and adding frequency hopping indication in a second system information block, wherein the frequency hopping sequence is leading to an out-of-band deployment of said at least one system information block.

Here effectively a frequency hopping scheme is suggested. With that the base node is in the position that the same SIB which is repeated for enhanced coverage a couple of time, moves in the frequency range, in particular is deployed once in-band and once out-of-band.

Further the suggested alignment of frequency hopping sequence with the wideband transmission scheme is dedicated to avoid wideband transmission subframes for the scheduled SIBs, that is the SIBs are for repetition then moved into the guardband.

For safe reception the SIBs get additionally an indication about the frequency hopping, that is the frequency resp. subcarrier, where the next repetition of the SIB can be decoded. That is needed for the receiving wireless communication device in order to figure out which frame to decode in order to receive the next repetition of the SIB.

This approach is in particular flexible as it allows situative shifting of the SIBs depending upon the traffic in the LTE band. Having in mind that the low-cost devices have a low priority for the cellular wireless network, it can be assumed that resources for these devices will be shifted where something is available. Therefore this approach leads to a better flexibility and robustness of broadcasting.

According to another preferred embodiment it is proposed a method wherein at least one system information block is transmitted in-band and at least one other system information block is transmitted out-of-band, wherein the position of the first system information block is determined by the master information block.

This embodiment indicates a mixed deployment of the system information blocks. The base node is put in the position to distribute the SIBs in-band or out-of-band, in particular taking into account if wideband transmissions are available.

According to a second aspect of the invention it is proposed a base node being part of a cellular wireless network for long term evolution configured to operate with at least one wireless communication device, the base node further being configured to support a dedicated resource region for a subset of camping wireless communication devices, which is capable of being deployed at least in-band and out-of-band in relation to a common frequency band, the base node comprising:

a collector for collecting configuration parameter at least for said dedicated resource region, configured to collect according to a predetermined time period and to arrange said configuration parameter in system information blocks, a deployment identificator, configured to identify if the dedicated resource region is deployed in-band, the base node further configured to add to at least one of said system information blocks an valid subframe indication for submitting system information blocks instead of wideband transmission blocks, in case the deployment identificator indicates in-band deployment and wideband transmission session is active, and transmit said system information blocks according to said valid subframe indication, otherwise transmit said system information blocks unchanged in a carrier frequency outside of the common frequency band.

The second aspect shows the same advantages as the first aspect.

As it is shown this invention advantageously solves the depicted problems and proposes a solution which smoothly works with the current technology standard evolvement.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

FIG. 1 schematically shows the downlink frame structure 1 of a base node according to an exemplifying embodiment of the invention for a base node supporting long term evolution (LTE). Such a base node is commonly known as an eNodeB and is part of a cellular wireless network at least supporting the 3GPP LTE technology standard. On each base node a plurality of wireless communication devices are supposed to camp.

Figure 1:
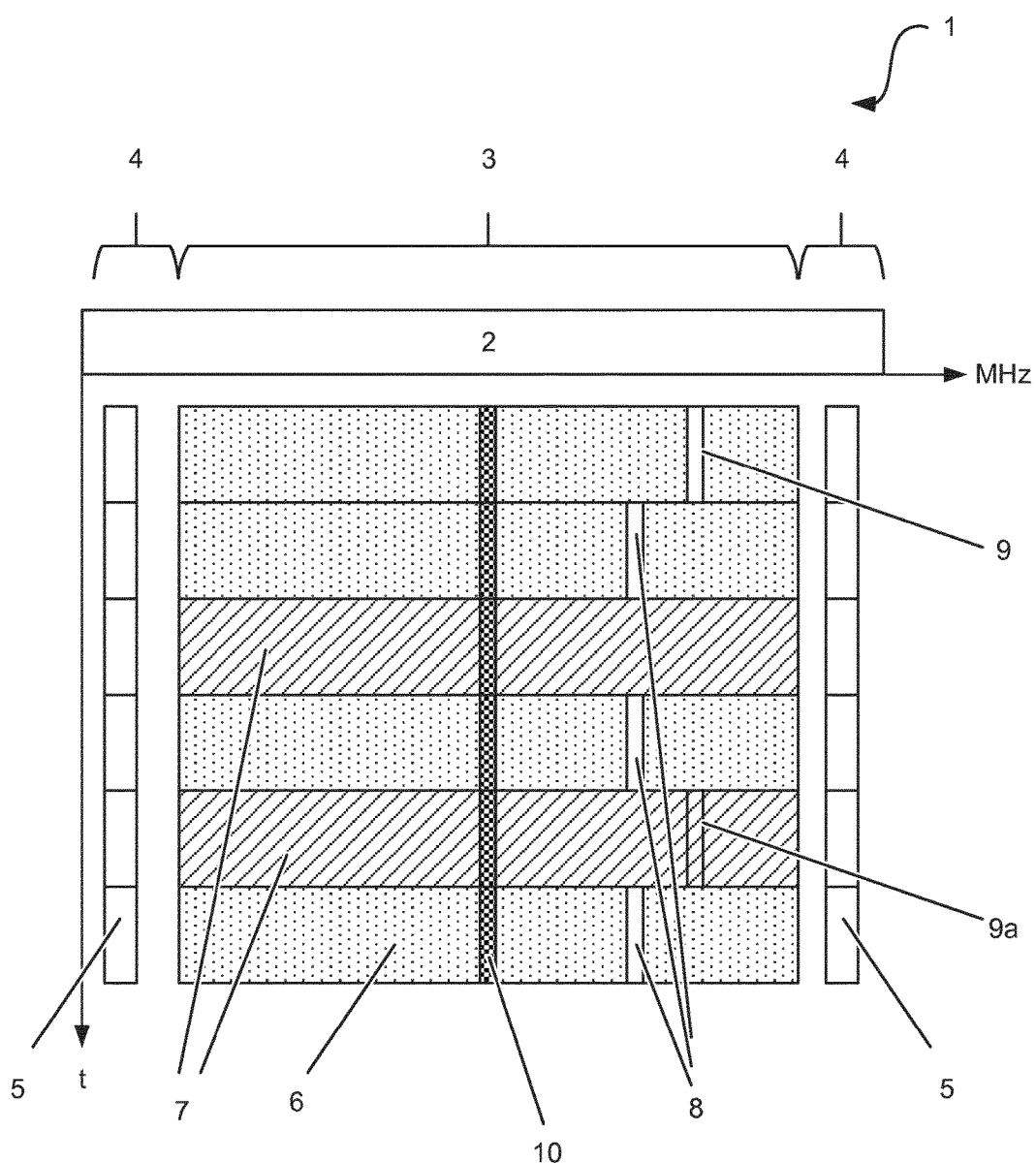
FIG. 1 represents the frame structure over an LTE frequency band of a base node according to the exemplifying embodiment.

The base node is in particular configured to support besides the common full LTE band also a dedicated resource region of the frame structure. Such a dedicated resource region is preferably designated for low-bandwidth wireless communication device which are not capable of decoding the whole range of a frequency band. Moreover the dedicated resource region may even be provide a different modulation scheme as the rest of the band. This in particular relates to narrowband (NB)-IoT modulation scheme.

Said frame structure 1 comprises the normal LTE band 3, e.g. of 18 MHz occupied by 1200 subcarriers spaced 15 kHz in the entire 20 MHz LTE band 1. This is the frequency band that is used and decoded by the common cellular handsets, and is divided in a predetermined amount of subcarriers, each spanning over 15 kHz.

Additionally the normal LTE band 3 is bordered by one guardband 4 on each ends of the frequency band. That guardband covers a range of up to 1 MHz on each side in case of 20 MHz LTE band. In general LTE only occupies 90% of the nominal bandwidth. It is currently foreseen that the guardbands 4 could be used as a dedicated resource region in particular for NB-IoT, but this is not mandatorily the case.

At the center of the LTE band 3 it is situated the master information block 10. This includes in particular scheduling information, including the positioning of the first system information block SIB1 8. This SIB1 8 is dedicated for a certain subset of camping wireless communication devices, in particular those operating in NB-IoT. Further another SIB1 (not shown) is available for common mobile handsets. The SIB1 is typically scheduled following a general pattern, e.g. every even system frame number (SFN), like here shown all two subframes.

The SIB1 8 is mainly positioned at a fixed frequency. Here it is shown a fixed frequency inside the LTE band 2, which means the SIB1 is deployed in-band. Further other SIBs are deployed, like SIB2 9 and further SIBx 5.

The SIBx are deployed in the guardbands 4, this deployment is called out-of-band. Such mixed deployments are possible, but not the only way of operation. In particular the guardband may also be used for dedicated data transmissions.

In the vertical direction of the schematic illustration the subframes are displayed. Here 6 subframes are shown, each covering a duration of 1 ms. In the LTE band 2 there are indicated by different hatching two wideband transmission subframes 7. These subframes are reserved for wideband transmission sessions like MBMS. In particular during wideband transmission subframes 7 no SIBs are scheduled.

Hence it is necessary at least in SIB1 8 to indicate that the respective wideband transmission subframes 7 are not to be decoded by the receiving wireless communication devices when they want to read the SIBs. In particular SIB1 8 is not scheduled in general during the wideband transmission subframes.

For the decoding of other SIBs 9 SIB1 contains a valid subframes indication i.e. indicating the subframes containing wideband transmission instead of NB-IoT transmission in-band, where according to the scheduling pattern of SIB 9 it would have been scheduled, but is not omitted (9a). In this case a pattern for the SIB 9 of all 4 subframes is foreseen, but in the valid subframe indication for the fifth shown subframe there is a notion that SIB 9 will be omitted here.

In particular in conjunction with enhanced coverage if would endanger the reception of the SIBs, if the wireless communication device would continue to accumulate the wideband transmission subframes to the received SIB transmissions of other subframes. If subframes with a different content would be included in the EC combining process the accumulation would not converge to decoding.

Further it can be seen the SIB1 is repeated more often as others. This is the system information block with the most important information, like the system value tag, access barring indications etc. Consequently it is the SIB1 which is read most frequently by the receiving wireless communication devices On the other hand due to this situation each increase of the size of SIB1 8 would increase the power needed for decoding the SIB1 remarkably. This effect is even immensely increased in case of enhanced coverage through the needed repetitions until it can be successfully decoded once, effectively it takes much longer to decode it.

With the omission of SIB1 transmission during wideband transmission subframes this decoding time would even be enlarged.

The situation is different for SIBs 5 scheduled in the guardband 4. Here it is possible irrespective of wideband transmissions to decode SIBs in each subframe, that is continuously.

Hence, for these SIBs the SIB1 does not have to comprise any indication in terms of at which subframes the decoding needs to be suspended.

Moreover if even the SIB1 and all further SIBs would be positioned in the guardband 4, then such additional indication data field of SIB1 could be omitted completely.

This indication is therefore according to this embodiment of the invention optional and can be omitted in case that some or even all SIBs are deployed out-of-band.

In effect this type of scheduling would, in particular for wireless communication devices operating in enhanced coverage, reduce the duration and the efforts for the wireless communication device for receiving a complete set of SIBs dedicated for this type of wireless communication device. This leads in particular to a quicker decoding with lower power consumption.

Figure 2:
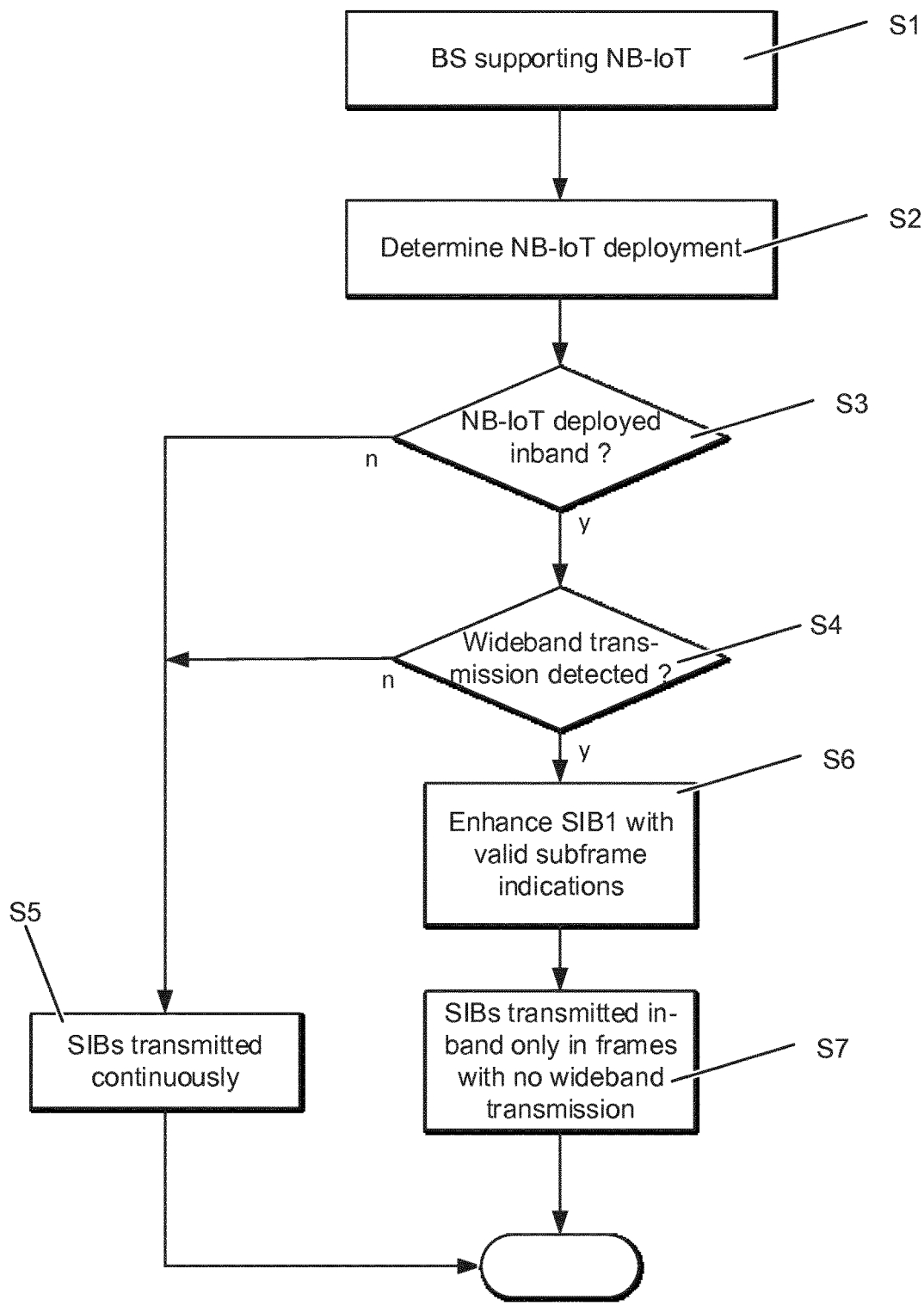
FIG. 2 shows a first flow chart setting out an exemplifying embodiment of the inventive method.

FIG. 2 shows an exemplifying flow chart of a preferred embodiment of the inventive method. It starts in step S1 with the base node (BS) of a LTE network, and this base node is configured to support NB-IoT, respectively any other dedicated resource which can be positioned in the guardband.

In step S2 the base node then determines if the NB-IoT resource blocks are deployed in-band or out-of-band. This in particular related to the SIB broadcast, e.g. as part of the PBCH, but could also affect other, also dedicated, channels. In this simplifying embodiment it is assumed that the situation is considered that either all or none of the SIBs are deployed out-of-band or not. In reality also a mixed approach is possible, and would require an amended approach.

In decision step S3 it is now branched in dependency of the deployment to an in-band handling or otherwise. Besides out-of-band deployment also stand-alone deployment would be another option. This would be a deployment of the NB-IoT unrelated to a common LTE band. Nevertheless the same method steps apply to a determined out-of-band and standalone deployment.

Should the determination result in an out-of-band or standalone deployment then the method flow branches to step S5 and allows transmitting the SIBs continuously. That means the SIB transmission is not affected by possible wideband transmissions.

In case of in-band deployment the method flow branches from step S3 to decision step S4. Here it is now checked if a wideband transmission is detected. Such a wideband transmission relates in particular to a session of the multimedia broadcast multicast service (MBMS). Should this not be the case, then the process flow branches again to step S5, where the SIBs are transmitted continuously, that is not interrupted, but in this case in in-band deployment.

Otherwise it is branched to step S6, where the SIB1 is enhanced by a valid subframe indication. This valid subframe indication indicates to the receiving wireless communication devices which subframes may be read for decoding the SIBs, and which are not, due to wideband transmission subframes. Such valid subframe indication is not needed for the case of out-of-band deployment and as long as no wideband transmission session is active.

Consequently the SIB transmission follows in step S7 this rule and hence the set of SIBs, including the enhanced SIB1 is transmitted in-band, but not during wideband transmission subframes.

The receiving wireless communication devices obviously have in the case of continuous SIB transmission faster and with less decoding efforts decoded the complete set of SIBs than with the interrupted transmission. This hold true all the more when the wireless communication devices are operating in enhanced coverage.

Figure 3:
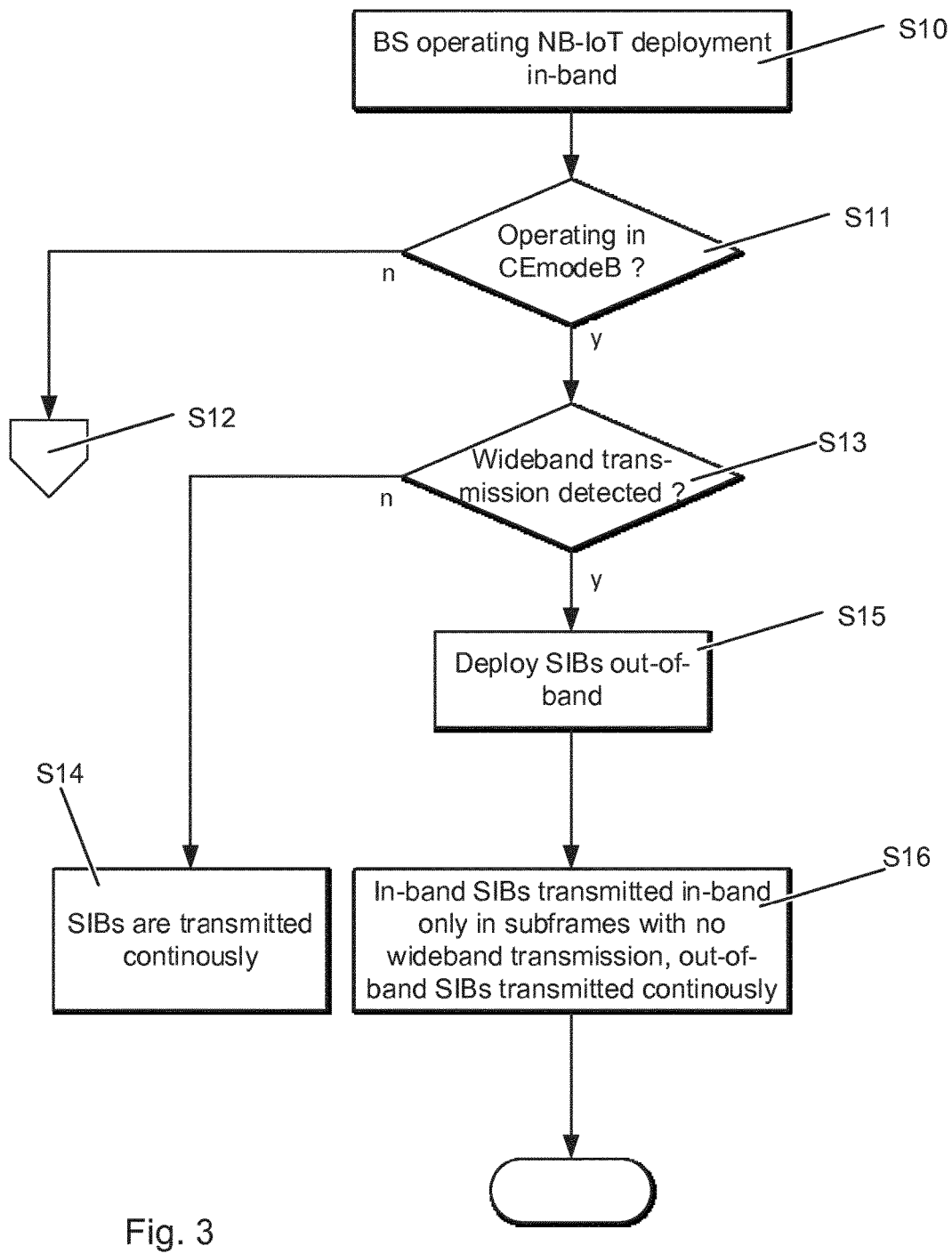
FIG. 3 represents in a second flow chart another exemplifying embodiment of the inventive method.

FIG. 3 shows another preferred exemplifying embodiment of the inventive method. Here it starts in step S10 with a base node supporting NB-IoT, but this is already deployed in-band. It is checked in decision step S11, if an operation in enhanced coverage is carried out.

This needs to be supported by the base node as well, in terms of repetition of the transmitted data. The density and number of repetitions of the SIBs depends on the level of coverage enhancement that is intended to be supported by the eNodeB. I.e. a SIB needs to be received sufficiently often prior its content could change in a new BCCH modification period. The base node can support the so-called CEmodeA, that means no or only shallow fading which requires only little accumulation over a few repetition. Opposed to that is CEmodeB which is deep coverage enhancement. For CEmodeA it should be possible to acquire information by very little accumulation and hence SIBs can be scheduled at a lower density and hence being scheduled contention free around wideband transmission. Should the base node not operate in enhanced coverage or only in CEmodeA the process flow branches to step S12, which complements practically to a branch to step S4 of FIG. 2.

In case of deep enhanced coverage resp. CEmodeB it is branched to decision step S13, where it is checked if a wideband transmission session is active or not. If no wideband transmission session is active then in step S14 SIBs are consequently transmitted continuously in-band.

Otherwise it is branched to step S15. Here it is decided by the base node to deploy a subset, that means at least one of the SIBs out-of-band. Typically it is not the SIB1 which can be moved to the guardband, as it is expected to stay on a constant frequency. But the SIB1 indicates to the receiving wireless communication devices where from now on the other SIBs SIB2-SIB13 are deployed.

Consequently the deployment then takes effect resulting in method step S16, wherein the in-band-SIBs, in particular SIB1, are scheduled not overlapping with wideband transmissions, while the out-of-band-SIBs are transmitted in the guardband with the possibility to be scheduled at all times. Only for the in-band-SIBs overlapping with wideband transmission the SIB1 needs to indicate with the valid subframe indication in which subframes intended SIB transmission would resp. would not collide with wideband frames.

The presence of wideband transmission frames during other times would not need to be indicated, hence if the number of potential collisions is sufficiently small this could be made by direct indication of the subframe and its repetition instead of indicating the validity of each subframe within a modification period.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments.

The invention claimed is:

1. Method for transmitting system information by a base node being part of a cellular wireless network, to at least one wireless communication device camping on the base node in a frame structure, the base node being configured to support a dedicated resource region embedded in the frame structure for a subset of camping wireless communication devices, wherein the dedicated resource region is capable of being deployed at least in-band and out-of-band in relation to a common frequency band, the method comprising the steps of:
  collecting configuration parameter for said dedicated resource region according to a predetermined time period and to arrange said configuration parameter in system information blocks,
  identifying if the dedicated resource region is deployed in-band,
    in case it is deployed in-band and a wideband transmission session is active, adding to at least one of the system information blocks a valid subframe indication for submitting system information blocks instead of wideband transmission blocks, and transmitting said system information blocks according to said valid subframe indication,
    in case it is not deployed in-band transmitting the system information blocks unchanged in a carrier frequency outside of the common frequency band.

2. Method according to claim 1, wherein the system information blocks are transmitted according to a coverage enhancement scheme comprising a plurality of repetitions, whereby the repetitions are transmitted in the dedicated resource region in case of in-band deployment interrupted through at least one of the wideband transmission blocks and in each subframe otherwise.

3. Method according to claim 2, further comprising the step of evaluating if the wideband transmission session is active and if the system information blocks are supposed to be transmitted according to an coverage enhancement scheme, and deploying at least one system information block out-of-band in case of the active wideband transmission session.

4. Method according to claim 3, further comprising the step of transmitting at least one system information block repeatedly according to a frequency hopping sequence by aligning the frequency hopping sequence with the wideband transmission and adding a frequency hopping indication in a second system information block,
  wherein the frequency hopping sequence is leading to an out-of-band deployment of said at least one system information block.

5. Method according to claim 1, wherein the wideband transmission session comprises at least one of:
  a multimedia broadcast multicast service, or
  a relay session for device-to-device operation with at least one other wireless communication device.

6. Method according to claim 1, wherein the dedicated resource region is operated according to at least one of:
  narrowband-IoT modulation, or
  LTE category-M.

7. Method according to claim 1, further comprising broadcasting a master information block,
  wherein at least one system information block is transmitted in-band and at least one other system information block is transmitted out-of-band, wherein the deployment of the first system information block is determined by the master information block.

8. Base node being part of a cellular wireless network configured to operate with at least one wireless communication device,
   the base node further being configured to transmit system information in a frame structure, and to support a dedicated resource region embedded in the frame structure for a subset of camping wireless communication devices, wherein the dedicated resource region is capable of being deployed at least in-band and out-of-band in relation to a common frequency band,
   the base node comprising:
      a collector for collecting a configuration parameter at least for said dedicated resource region, configured to collect according to a predetermined time period and to arrange said configuration parameter in system information blocks,
   the base node further configured to:
      identify if the dedicated resource region is deployed in-band,
      add to at least one of said system information blocks a valid subframe indication for submitting system information blocks instead of wideband transmission blocks, in a case where in-band deployment and wideband transmission session is active, and
      transmit said system information blocks according to said valid subframe indication, otherwise
      transmit said system information blocks unchanged in a carrier frequency outside of the common frequency band.

9. Base node according to claim 8, further configured to operate in coverage enhancement scheme and to transmit the system information according to said coverage enhancement scheme with a plurality of repetitions, whereby the repetitions are transmitted in the dedicated resource region in case of in-band deployment interrupted through wideband transmission blocks and in each subframe otherwise.

10. Base node according to claim 9, further configured to evaluate if the wideband transmission session is active and if the system information blocks are supposed to be transmitted according to coverage enhancement scheme, and to deploy at least one system information block out-of-band in case of the active wideband transmission session.

11. Base node according to claim 10, further configured to transmit at least one system information block repeatedly according to a frequency hopping sequence by aligning the frequency hopping sequence with the wideband transmission and adding a frequency hopping indication in a second system information block, wherein the frequency hopping sequence is leading to an out-of-band deployment of said at least one system information block.

12. Base node according to claim 8, wherein the wideband transmission session comprises at least one of:
    a multimedia broadcast multicast service, or
    a relay session for device-to-device operation with at least one other wireless communication device.

13. Base node according to claim 8, wherein the dedicated resource region is operated according to at least one of:
    narrowband-IoT modulation, or
    LTE category-M.

14. Base node according to claim 8, configured to broadcast a master information block,
    further configured to transmit at least one system information block in-band and at least one other system information block is transmitted out-of-band, wherein the deployment of the first system information block is determined by the master information block.

* * * * *